US009648239B2

(12) United States Patent
Mårtensson et al.

(10) Patent No.: US 9,648,239 B2
(45) Date of Patent: May 9, 2017

(54) CONTROL OF SHAKE BLUR AND MOTION BLUR FOR PIXEL MULTIPLEXING CAMERAS

(71) Applicant: Sony Corporation, Tokyo (JP)

(72) Inventors: Linus Mårtensson, Lund (SE); Ola Thörn, Lund (SE); Jonas Gustavsson, Lund (SE)

(73) Assignees: Sony Corporation, Tokyo (JP); Sony Mobile Communications Inc., Tokyo (JP)

( * ) Notice: Subject to any disclaimer, the term of this patent is extended or adjusted under 35 U.S.C. 154(b) by 176 days.

(21) Appl. No.: 14/405,600

(22) PCT Filed: Mar. 19, 2014

(86) PCT No.: PCT/IB2014/059960
§ 371 (c)(1),
(2) Date: Dec. 4, 2014

(87) PCT Pub. No.: WO2015/140596
PCT Pub. Date: Sep. 24, 2015

(65) Prior Publication Data
US 2016/0286129 A1 Sep. 29, 2016

(51) Int. Cl.
*H04N 5/228* (2006.01)
*G03B 17/00* (2006.01)
*H04N 5/232* (2006.01)

(52) U.S. Cl.
CPC ..... *H04N 5/23267* (2013.01); *H04N 5/23248* (2013.01); *H04N 5/23254* (2013.01); *H04N 5/23258* (2013.01)

(58) Field of Classification Search
CPC ........... H04N 5/23293; H04N 5/23245; H04N 5/2353; H04N 2101/00; H04N 5/2254;
(Continued)

(56) References Cited

U.S. PATENT DOCUMENTS 8,964,039 B2 * 2/2015 Asakura ................ H04N 5/772
348/208.1
2005/0001906 A1 * 1/2005 Sato .................... H04N 5/23248
348/208.6
(Continued)

FOREIGN PATENT DOCUMENTS

EP 2053844 A1 4/2009
EP 2200276 A1 6/2010
WO 2013062742 A1 5/2013

OTHER PUBLICATIONS

International Search Report and Written Opinion; Nov. 25, 2014; issued in International Patent Application No. PCT/IB2014/059960.
(Continued)

*Primary Examiner* — Trung Diep
(74) *Attorney, Agent, or Firm* — James C. Edwards; Moore & Van Allen, PLLC

(57) ABSTRACT

The invention is directed to controlling shake blur and motion blur associated with an image. An exemplary method comprises: receiving a first image frame and a second image frame associated with the image; determining first movement of the camera in the first image frame or the second image frame; determining second movement of the camera between the first image frame and the second image frame; controlling, based on the first movement, at least a portion of shake blur associated with the image; and controlling, based on the second movement, at least a portion of motion blur associated with the image.

15 Claims, 2 Drawing Sheets

(58) Field of Classification Search
CPC .. H04N 5/2256; H04N 5/23232; H04N 5/232; H04N 5/23216; H04N 5/2354; H04N 2201/0096; H04N 5/2258; H04N 5/23296; H04N 5/235
USPC ............ 348/208.9, 208.1–208.4; 396/52, 55
See application file for complete search history.

(56) References Cited

U.S. PATENT DOCUMENTS

| | | | |
|---|---|---|---|
| 2007/0014554 A1* | 1/2007 | Sasaki ................ | H04N 5/23248 396/55 |
| 2009/0102935 A1* | 4/2009 | Hung .................... | H04N 5/235 348/222.1 |

OTHER PUBLICATIONS

International Preliminary Report on Patentability; Sep. 29, 2016; issued in International Patent Application No. PCT/IB2014/059960.

* cited by examiner

CONTROL OF SHAKE BLUR AND MOTION BLUR FOR PIXEL MULTIPLEXING CAMERAS

BACKGROUND ART

A captured image is blurred when a user of a camera does not remain still (or shakes the camera) when capturing the image. There is a need to control this "shake blur" from a captured image after capturing the image. Motion blur is the streaking of rapidly moving objects in a still image or a sequence of still images. There is a need to control this motion blur from a captured image after capturing the image.

SUMMARY

Embodiments of the invention are directed to a system, method, and computer program product for controlling shake blur and motion blur associated with an image. An exemplary method comprises: receiving a first image frame and a second image frame associated with the image; determining first movement of the camera in the first image frame or the second image frame; determining second movement of the camera between the first image frame and the second image frame; controlling, based on the first movement, at least a portion of shake blur associated with the image; and controlling, based on the second movement, at least a portion of motion blur associated with the image.

In some embodiments, the camera comprises a pixel multiplexing camera.

In some embodiments, the first movement is determined using a movement sensor associated with the camera.

In some embodiments, the movement sensor samples the image substantially synchronously with the camera.

In some embodiments, the movement sensor comprises an accelerometer or a gyroscope.

In some embodiments, the camera is part of a mobile device.

In some embodiments, the first movement comprises a direction of the first movement and a magnitude of the first movement.

In some embodiments, the second movement comprises a direction of the second movement and a magnitude of the second movement.

In some embodiments, the first image frame and the second image frame are associated with a first resolution, wherein the first resolution is less than a predetermined resolution, wherein the image is associated with a second resolution, and wherein the second resolution is equal to or greater than the predetermined resolution.

In some embodiments, the method further comprises providing a controller for the image.

In some embodiments, the controller is controlled by a user gesture or a user input.

In some embodiments, the controller enables control of a user-defined amount of motion blur associated with the image.

In some embodiments, the controller enables control of a user-defined amount of motion blur associated with a first object in the image without affecting the rest of the image.

In some embodiments, controlling at least a portion of shake blur comprises decreasing at least a portion of shake blur, and controlling at least a portion of motion blur comprises decreasing at least a portion of motion blur.

In some embodiments, controlling at least a portion of shake blur comprises increasing at least a portion of shake blur, and controlling at least a portion of motion blur comprises increasing at least a portion of motion blur.

In some embodiments, a system is provided for controlling shake blur and motion blur associated with an image. The system comprises: camera; a memory; a processor; a module, stored in the memory, executable by the processor, and configured to: receive a first image frame and a second image frame associated with the image; determine first movement of the camera in the first image frame or the second image frame; determine second movement of the camera between the first image frame and the second image frame; control, based on the first movement, at least a portion of shake blur associated with the image; and control, based on the second movement, at least a portion of motion blur associated with the image.

In some embodiments, a computer program product is provided for controlling shake blur and motion blur associated with an image. The computer program product comprises a non-transitory computer-readable medium comprising code configured to: receive a first image frame and a second image frame associated with the image; determine first movement of the camera in the first image frame or the second image frame; determine second movement of the camera between the first image frame and the second image frame; control, based on the first movement, at least a portion of shake blur associated with the image; and control, based on the second movement, at least a portion of motion blur associated with the image.

BRIEF DESCRIPTION OF DRAWINGS

Figure 1:
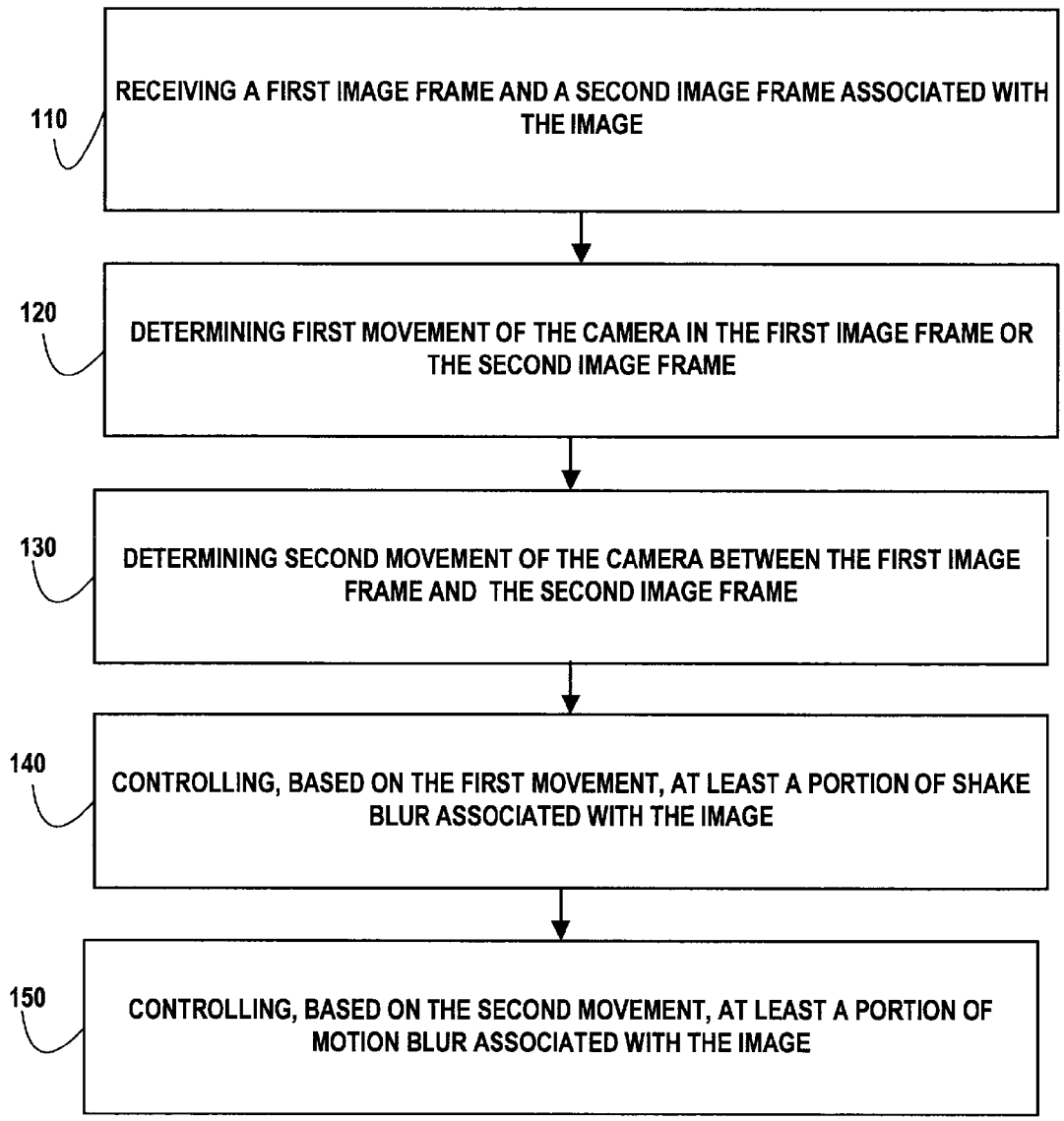
Figure 2:
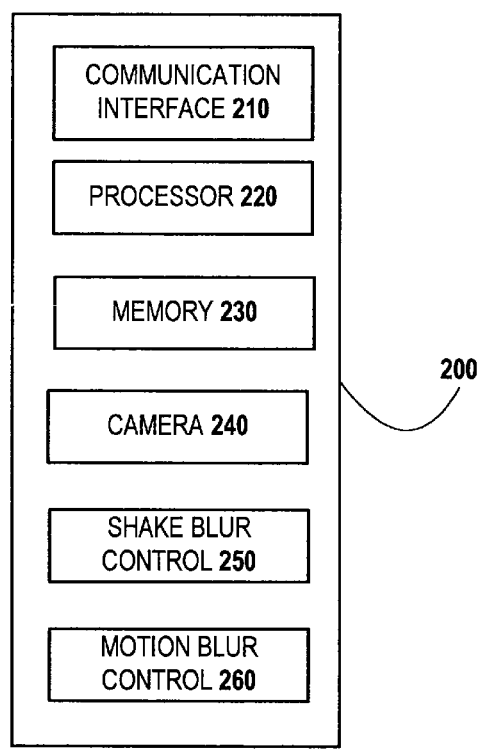

Having thus described embodiments of the invention in general terms, reference will now be made to the accompanying drawings, where:

FIG. 1 illustrates a process flow for controlling motion blur and shake blur associated with an image, in accordance with embodiments of the present invention; and FIG. 2 illustrates an exemplary camera, in accordance with embodiments of the present invention.

DESCRIPTION OF EMBODIMENTS

Embodiments of the present invention now may be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout.

The present invention is directed to controlling shake blur and motion blur associated with a captured image (e.g., during a post-processing procedure associated with the image). In some embodiments, the present invention uses a pixel multiplexing camera. The camera comprises a camera lens that receives light. The light hits a rotating mirror located in the camera that reflects the light onto a first partial portion of a photographic sensor located in the camera. The light is then reflected from the first partial portion of the sensor to a second partial portion of the sensor. Subsequently, the light is reflected from the second partial portion of the sensor to a third partial portion of the sensor, and so on. The reflection from each partial portion of the sensor comprises a partial portion of an image. Each partial portion of the image may be a low resolution image (e.g., having less than predetermined resolution). The various partial portions of the image can be combined to form a high resolution image (e.g., having equal to or greater than a predetermined resolution). The various partial portions of the image may also be referred to as image frames. The invention is not limited to using a pixel multiplexing camera. In alternate embodiments, other types of cameras may be used.

As used herein, controlling shake blur and motion blur refers to modifying the shake blur and motion blur. In some embodiments, modifying the shake blur and motion blur refers to decreasing (e.g., removing) the shake blur and motion blur. In other embodiments, modifying the shake blur and motion blur refers to increasing the shake blur and motion blur.

In the present invention, a pixel multiplexing camera is synchronized with an accelerometer and/or a gyroscope associated with the camera. The accelerometer and/or gyroscope may be located inside the housing of the camera or may be located along an interior and/or exterior surface of the housing of the camera. As used herein, a gyroscope is a device that uses the Earth's gravity to enable determination of the camera's orientation. As used herein, an accelerometer is a device that is used to measure non-gravitational acceleration of the camera. As used herein, both an accelerometer and a gyroscope are movement sensors that enable determination of the movement of the camera, including the magnitude of the movement and the direction of the movement.

The accelerometer and/or gyroscope samples the image substantially synchronously with the camera. For example, the sampling frequency for the accelerometer and/or gyroscope is 100 Hz. This enables determination of how the camera (and the camera housing) moves in an image frame. How the camera moves in an image frame comprises a magnitude of the move and/or a direction of the move. How the camera moves in an image frame comprises the shake blur as described herein. By determining the shake blur, the shake blur can be corrected or removed from the captured image by the shake blur control module described in FIG. 2. Therefore, the present invention enables removing shake blur without using mechanical compensation that counterbalances the movement of the camera.

The camera as described herein captures multiple image frames or multiple image portions as described herein. The image frames are captured in low resolution (e.g., less than a predetermined resolution). The camera can determine whether there is movement between two consecutively captured image frames by comparing both the frames. The amount of this movement and/or the direction of this movement comprises motion blur. When this motion blur is determined, this motion blur can be corrected or removed from the captured image by the motion blur control module described in FIG. 2.

In some embodiments, a controller (e.g., a graphical controller) can be provided for an image. The controller may comprise a widget such as a slider or other indicator. The controller may be controlled using a user gesture or other user input. The controller may be located adjacent to the image (or an object on the image), or may appear on the image (or on an object on the image) when the user hovers a finger or pointer over the image or object on the image. In some embodiments, the controller can be moved from one object on the image to another object on the image based on a user gesture. A user of the camera can modify a setting of the controller to determine how much motion blur the user wants to remove from the image. In some embodiments, the user can modify a setting of the controller to determine how much (e.g., a magnitude of) motion blur the user wants to remove from a particular object (e.g., a person, an inanimate object, etc.) on the image. Therefore, the present invention enables a user to retain a user-determined amount of motion blur on a first object in the image, and remove a user-determined amount of motion blur from a second object in the image.

Referring now to the process flow of FIG. 1, FIG. 1 illustrates a process flow for controlling shake blur and motion blur associated with an image captured by a camera (e.g., a pixel multiplexing camera). In some embodiments, the camera is part of a mobile device (e.g., a mobile phone). At block 110, the process flow comprises receiving a first image frame and a second image frame associated with the image. The first image frame and the second image frame are associated with a first resolution that is less than a predetermined resolution, and the image is associated with a second resolution that is equal to or greater than the predetermined resolution. At block 120, the process flow comprises determining first movement (e.g., using a movement sensor such as an accelerometer and/or gyroscope) of the camera in the first image frame or the second image frame. The accelerometer and/or gyroscope samples the image substantially synchronously with the camera. As used herein, first movement comprises a direction of the first movement and/or a magnitude of the first movement. At block 130, the process flow comprises determining second movement of the camera between the first image frame and the second image frame. As used herein, second movement comprises a direction of the second movement and/or a magnitude of the second movement. At block 140, the process flow comprises controlling, based on the first movement, at least a portion of shake blur associated with the image. At block 150, the process flow comprises controlling, based on the second movement, at least a portion of motion blur associated with the image.

In some embodiments, the process flow further comprises providing a controller for the image, wherein the controller is controlled by a user gesture or user input. In some embodiments, the controller enables removal of a user-defined amount of motion blur associated with the image. In other embodiments, the controller enables removal of a user-defined amount of motion blur associated with a first object in the image without affecting the rest of the image.

The invention is not limited to any particular types of devices containing cameras (e.g., pixel multiplexing cameras). Examples of such devices include portable or non-portable media devices, mobile phones or other mobile computing devices, mobile televisions, laptop computers, smart screens, tablet computers or tablets, portable desktop computers, e-readers, eyewear, scanners, standalone cameras, portable media devices, gaming devices, or other image-capturing devices, watches, bands (e.g., wristbands) or other wearable devices, or other portable or non-portable computing or non-computing devices.

Referring now to FIG. 2, FIG. 2 illustrates an exemplary device 200 comprising a camera as described herein. Each device or system described herein is a computing device that comprises a camera 240, a processor 220, a memory 230, and a module stored in the memory, executable by the processor, and configured to perform the various processes described herein. The module may comprise a shake blur control module 250, and a motion blur control module 260. The processor 220 described herein generally includes circuitry for implementing audio, visual, and/or logic functions. For example, the processor 220 may include a digital signal processor device, a microprocessor device, and various analog-to-digital converters, digital-to-analog converters, and other support circuits. The processor 220 may also include functionality to operate one or more software programs based at least partially on computer-executable program code portions thereof, which may be stored, for example, in a memory.

The memory 230 may include any computer-readable medium. For example, memory 230 may include volatile memory, such as volatile random access memory (RAM) having a cache area for the temporary storage of information. Memory 230 may also include non-volatile memory, which may be embedded and/or may be removable. The non-volatile memory may additionally or alternatively include an EEPROM, flash memory, and/or the like. The memory 230 may store any one or more of pieces of information and data used by the system in which it resides to implement the functions of that system. Additionally, in embodiments where the camera is part of a mobile communication device, a communication interface 210 is provided. The communication interface 210 enables wireless communication with a network and/or with other devices. The shake blur control module 250 and the motion blur control module 260 enable controlling (e.g., removing) the shake blur and motion blur from a captured image as described herein.

In accordance with embodiments of the invention, the term "module" with respect to a system (or a device) may refer to a hardware component of the system, a software component of the system, or a component of the system that includes both hardware and software. As used herein, a module may include one or more modules, where each module may reside in separate pieces of hardware or software.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. As used herein, "at least one" shall mean "one or more" and these phrases are intended to be interchangeable. Accordingly, the terms "a" and/or "an" shall mean "at least one" or "one or more," even though the phrase "one or more" or "at least one" is also used herein. Like numbers refer to like elements throughout.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures in a database, etc.), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electro-magnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g., a memory, etc.) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

The invention claimed is:

1. A method for controlling shake blur and motion blur associated with an image captured by a camera, the method comprising:
   receiving a first image frame and a second image frame associated with the image, wherein the second image frame is consecutively captured after the first image frame;
   determining a first movement of the camera in the first image frame and the second image frame, wherein the first movement is determined using at least one movement sensor in communication with the camera and configured to sample the image synchronously with the camera;
   determining a second movement of the camera between the first image frame and the second image frame, wherein the second movement is determined by comparing the first movement in the first frame to the first movement in the second frame;
   controlling, based on the first movement, at least a portion of shake blur associated with the image; and
   controlling, based on the second movement, at least a portion of motion blur associated with the image.

2. The method of claim 1, wherein the camera comprises a pixel multiplexing camera.

3. The method of claim 1, wherein the at least one movement sensor comprises at least one of an accelerometer or a gyroscope.

4. The method of claim 1, wherein the camera is part of a mobile device.

5. The method of claim 1, wherein the first movement comprises a direction of the first movement and a magnitude of the first movement.

6. The method of claim 1, wherein the second movement comprises a direction of the second movement and a magnitude of the second movement.

7. The method of claim 1, wherein the first image frame and the second image frame are associated with a first resolution, wherein the first resolution is less than a predetermined resolution, wherein the image is associated with a second resolution, and wherein the second resolution is equal to or greater than the predetermined resolution.

8. The method of claim 1, further comprising providing a controller for the image.

9. The method of claim 8, wherein the controller is controlled by a user gesture or a user input.

10. The method of claim 8, wherein the controller enables removal of a user-defined amount of motion blur associated with the image.

11. The method of claim 8, wherein the controller enables removal of a user-defined amount of motion blur associated with a first object in the image without affecting the rest of the image.

12. The method of claim 1, wherein controlling at least a portion of shake blur comprises decreasing at least a portion of shake blur, and wherein controlling at least a portion of motion blur comprises decreasing at least a portion of motion blur.

13. The method of claim 1, wherein controlling at least a portion of shake blur comprises increasing at least a portion of shake blur, and wherein controlling at least a portion of motion blur comprises increasing at least a portion of motion blur.

14. A system for controlling shake blur and motion blur associated with an image, the system comprising:
   a camera including:
      a memory;
      a processor in communication with the memory;
      at least one movement sensor in communication with the processor and configured to synchronously sample images captured by the camera; and
      a module, stored in the memory, executable by the processor, and configured to:
         receive a first image frame and a second image frame associated with the image, wherein the second image frame is consecutively captured after the first image frame,
         determine a first movement of the camera in the first image frame and the second image frame, wherein the first movement is determined using the at least one movement sensor,
         determine a second movement of the camera between the first image frame and the second image frame, wherein the second movement is determined by comparing the first movement in the first frame to the first movement in the second frame,
         control, based on the first movement, at least a portion of shake blur associated with the image, and
         control, based on the second movement, at least a portion of motion blur associated with the image.

15. A computer program product for controlling shake blur and motion blur associated with an image, the computer program product comprising a non-transitory computer-readable medium comprising code configured to:
   receive a first image frame and a second image frame associated with the image, wherein the second image frame is consecutively captured after the first image frame;
   determine a first movement of the camera in the first image frame and the second image frame, wherein the first movement is determined using at least one movement sensor in communication with the camera and configured to sample the image synchronously with the camera;

determine a second movement of the camera between the first image frame and the second image frame, wherein the second movement is determined by comparing the first movement in the first frame to the first movement in the second frame;

control, based on the first movement, at least a portion of shake blur associated with the image; and control, based on the second movement, at least a portion of motion blur associated with the image.

* * * * *